Jan. 30, 1940.   H. DEMORY   2,188,768
HARVESTING DEVICE
Filed June 20, 1938   2 Sheets-Sheet 1

INVENTOR.
HARRY DEMORY
BY Flournoy Corey
ATTORNEY.

Jan. 30, 1940.  H. DEMORY  2,188,768
HARVESTING DEVICE
Filed June 20, 1938  2 Sheets-Sheet 2
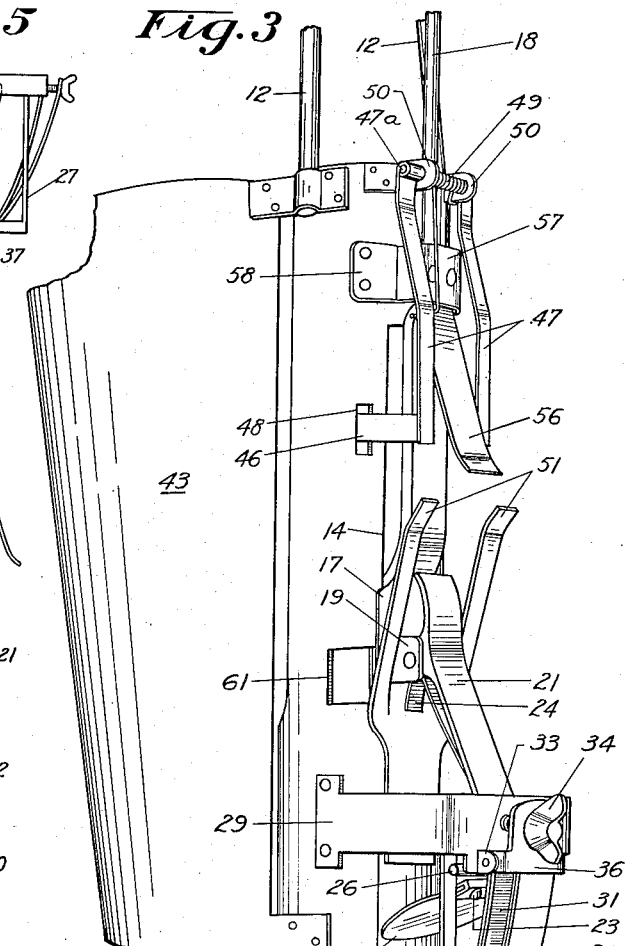
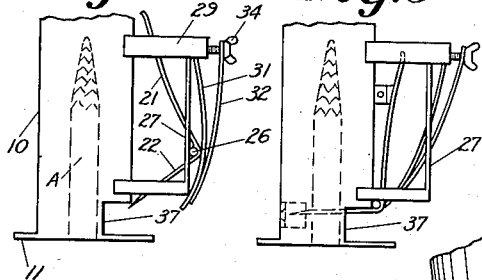
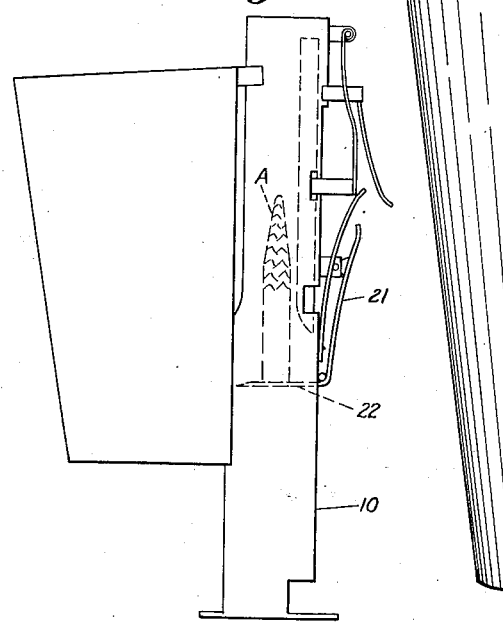
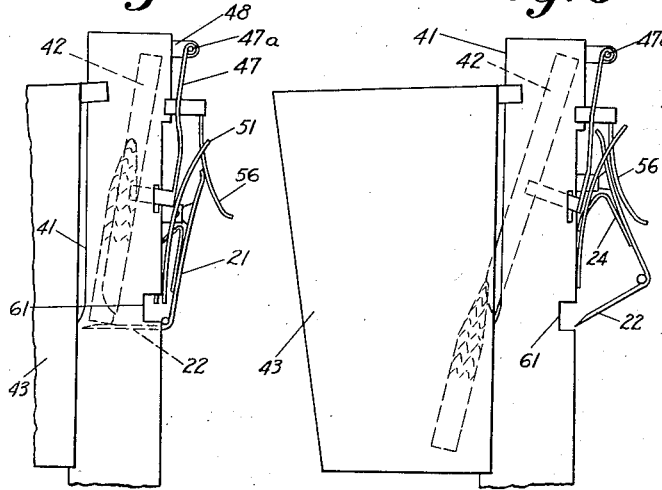
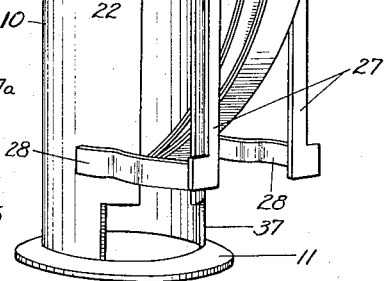
INVENTOR.
HARRY DEMORY
BY Flournoy Corey
ATTORNEY.

Patented Jan. 30, 1940

2,188,768

UNITED STATES PATENT OFFICE 2,188,768

HARVESTING DEVICE

Harry Demory, Cedar Rapids, Iowa

Application June 20, 1938, Serial No. 214,747

16 Claims. (Cl. 56—327)

This invention relates to a device for harvesting vegetables, more especially intended for the harvesting of asparagus.

It has been the general practice in the past to harvest asparagus tips by hand with a sharp knife. This is done by cutting the vegetable off close to the ground. This makes it necessary for the person cutting the asparagus to stoop over at his work, and this stooping operation becomes a very tedious and back-breaking job, especially when performed for several hours at a time. Furthermore, it is a relatively slow method of performing the job. Devices have been proposed in the past for performing this operation. These devices of the prior art have not been entirely satisfactory inasmuch as they have been more or less clumsy in their structure and have required the operation of two or more levers to perform a single cutting and conveying operation.

An object of my invention is to provide a device of this character that will permit a speedy harvesting of this vegetable or this type of vegetable.

Another object of my invention is to provide a device which will eliminate most of the back-breaking labor now necessary in the harvesting of this particular vegetable.

Another object of my invention is to provide a device that will operate with as few motions as possible.

Another object of my invention is to provide a device which will cut off a stalk of asparagus and raise it into a container with a simple operation of a single lever or handle.

Another object of my invention is to provide such a device which will be sturdy in construction, compact, and light in weight.

A further object of my invention is to provide a device which will be adjustable to compensate for stalks of asparagus of varying toughness.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 3 is an elevational view in perspective of my device.

Figures 4, 5, 6, 7 and 8 illustrate my device in various operating positions during the cutting and the raising of a single stalk of asparagus. The figures illustrate means for directing the cut stalk into a basket or container, and for resetting the device for another operation.

Figure 1:
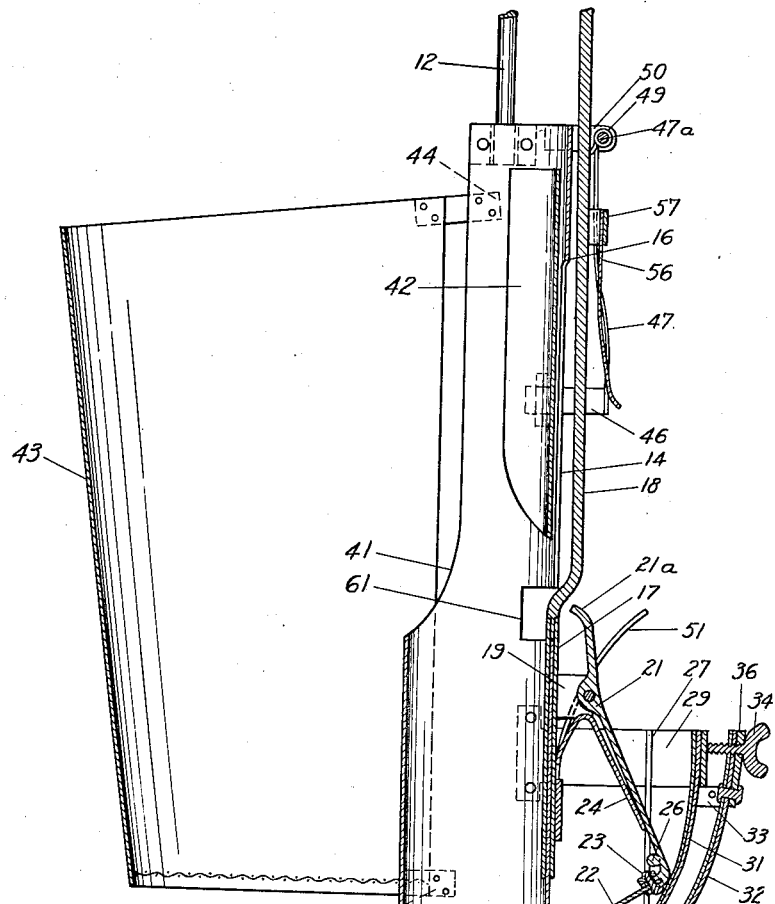
Figure 1 represents a vertical section taken through the center of my device.
Figure 2:
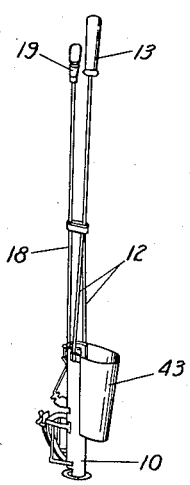
Figure 2 is a view in perspective illustrating in particular the operating handle of the device shown in Figure 1.

A preferred embodiment of my device includes a barrel 10 having a flange 11 at the bottom to bear against the earth, and rods 12 attached at the top to connect the barrel with a handle 13. The barrel 10 is furnished with a slot in one side, as indicated at 14. This slot extends from a point close to the bottom of the barrel to a point as at 16 near the top of the barrel, and a member 17 is fitted within this slot for easy sliding motion. This member 17 has flanged edges to retain it in position within the slot 14 and is connected by an operating rod 18 to an operating handle 19, said rod extending substantially parallel to the rod 12 and to a point close to the handle 13.

The member 17 may consist of a central member attached to and extending from the end of the operating rod 18, and substantially the width of the slot and having two wider plates attached to the central member, one or either side of the wall of the barrel, the extending edges of these plates forming the flanges to retain this sliding member in position. An arm 21 is pivotally attached to this sliding member 17 between ears 19 extending outwardly from the member. Attached to the lower end of this arm is a cutter blade 22 sharpened, as at 22a. This cutter blade is held in place on the end of the arm 21 by some means, such as the screws 23, threaded in place to permit the easy removal and replacement of the cutter blade when it becomes dull. The arm 21 is held in an outwardly extending position, as shown in Figure 1, by means of a light leaf spring indicated at 24.

The arm 21 is provided, at its lower end at a point close to the blade, with a cross rod 26 which extends over and rides on rails 27. These rails 27 extend parallel with the barrel 10 but at a sufficient distance from the barrel to permit the cutting edge of the cutter 22 to clear the barrel as the handle 19 is pressed toward the bottom position. The rails 27 are spaced from the barrel and supported by strap members 28 and 29.

The upper strap member 29 is preferably in the form of a U, and a combination of leaf springs, as shown at 31 is attached to the lower portion of these strap members. These springs are curved inwardly toward the bottom of the barrel and press against the lower end of the arm 21 with increased force as the cutter is pressed toward the bottom of the barrel. An auxiliary leaf spring 32 is also provided and is pivoted to the U shaped member 29, as indicated at 33.

A small hinging member 36 is attached to this auxiliary spring member and pivoted to the U member 29, as indicated at 33. This hinge member 36 is threaded to receive a wing screw 34. Adjustment of this screw tends to increase or decrease the amount of pressure applied by the auxiliary spring 32 against the bottom end of the main spring 31.

A portion of the barrel 10 is cut away near the bottom to form an opening 37. This opening is in such a position that the cutter blade 22 will pass through it as the guide rod 26 drops off the ends of the guide rails 27.

A detachable bumper 38, is provided at the rear of the barrel and held in place by some means such as threaded screws, as indicated at 39. This bumper may be of rubber or some similar material so that the cutter blade will not be as quickly dulled as if it were to strike directly upon the inside wall of the brass barrel.

An opening 41 is provided in the back wall of the barrel from a point near the middle of the barrel to the top of the barrel. A curved, leaf-like member 42 pivoted near the top of the barrel acts to kick the asparagus tip, when it is raised to the proper height, out through the opening 41 into a hopper 43.

This hopper may be riveted, screwed, or demountably attached to the barrel as illustrated at 44. This hopper is provided with a wire screen at the bottom to permit any dirt adhering to the asparagus tips to fall through to the ground. This hopper may be of any size desired, but it is preferable that it be of a size to hold a good sized handful of tips.

The kick-out member 42 is preferably pivoted at the top of the barrel by means of a pair of legs 46 extending through holes 48 in the wall of the barrel. These legs 46 are attached to a pair of strap members 47 which extend upwardly and are attached to a shaft 47a. This shaft is pivotally mounted within a pair of ears 50 which are attached to the barrel at its upper end. A torsional spring 49 is provided about this pivotal shaft to hold the strap members 47 away from the side of the barrel, thereby holding the leaf member 42 closely against the inside of the barrel.

A pair of strap-like cam members 51 are attached to the slide member 17 in such a manner that they will contact the outer surfaces of the leaf supporting strap members 47 as the slide member is raised after a stalk of asparagus has been cut and as that stalk reaches a point in front of the leaf member 42. These cam members kick the lower end of the leaf member 42 inwardly against the action of the spring 49 and about the pivotal point 47a.

The upper end of the cutter blade lever arm 21 comprises another strap-like cam member 21a which engages another leaf spring 56. This leaf spring is attached at its upper end to a U shaped supporting member 57 and acts in conjunction with the spring 24 to force the cutter supporting arm outwardly. The inner ends of the member 57 are riveted or otherwise fastened to the barrel, as at 58. This leaf member supporting means is positioned to extend outwardly between the leaf supporting strap members 47 without interfering with them and also extends over the operating rod 18.

The leaf spring 56 tends, while in engagement with the cam acting end 21a of the cutter lever, to throw the cutter blade to a position outside of the barrel. This is not possible, however, until the cutter blade has been raised to such a height as to be opposite an opening or slot provided in the side of the barrel, as at 61. This slot or opening is similar to the opening in the bottom of the barrel.

The structure will now be considered with the cutter blade in several positions during the operation of cutting a single asparagus tip.

Figure 4 illustrates the position of the cutter blade and supporting structure as the barrel is placed on the ground over a stalk of asparagus marked A. The rod 26, sliding along the guide rail 27, is shown as nearing the bottom end of the guide rail. The springs 31 and 32 supply considerable pressure against the outer side of the cutter blade supporting lever, and as the rod 26 passes over the lower ends of the guide rails, the cutter is snapped inwardly through the slot 37 by the pressure of the springs 31 and 32, the sharp edge of the cutter blade shearing off the stalk of asparagus close to the ground. The position of the cutter after this operation is shown in Figure 5.

The asparagus tip is then supported on the cutter blade and, as the operating handle 18 is pulled upwardly by means of the operating handle, the stalk is carried upwardly as shown in Figure 6 until it is opposite the opening 41 in the side of the barrel next to the hopper 43.

When it reaches this position an action as illustrated in Figure 7 takes place. The strap-like cam members 51, which are attached to the slidable blade supporting member, gradually contact the outer surfaces of the leaf supporting and pivoting straps 47. Due to the action of these parts one upon the other, the leaf member is kicked inwardly and the stalk of asparagus is kicked through the opening 41 into the hopper. The cutter blade, upon being raised slightly higher, comes opposite the opening 61, and spring pressure exerted by the leaf springs 24 and 56 forces the cutter blade outwardly into the position shown in Figure 8. In this position it is ready for another operation. The barrel 10 is placed over the stalk of asparagus and the operating handle is pushed down until the cutter blade supporting and guiding rod 26 rides upon the guide rails as shown in Figure 4.

During the operation of this device in the field it is placed over the asparagus tip and the handle is depressed as rapidly as desired. The lifting of the handle throws the tip into the hopper and the device is ready for another cutting operation. The cutter blades may become dulled after two or three hours operation, and I have provided a structure which permits the ready replacement of sharpened cutter blades in the field. Also I have provided a means of adjusting the spring pressure on the cutter blade to compensate for exceptionally tough asparagus stalks. A wing screw easily turned by the fingers is provided to make the adjustment.

It is apparent that I have provided a device to permit the fast and easy gathering of asparagus tips, one which is simple in operation and sturdy in construction. It is also apparent that I have provided a device which will permit the harvesting of such vegetables without the back-breaking and tiresome labor necessary with the means generally employed.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a vegetable harvesting means, a body member in the form of a barrel, said barrel having a slot lengthwise along one side, a flanged slide member adapted for reciprocating motion in this slot, an extended handle attached to the barrel, an extended operating handle attached to the slide member, a lever arm pivotally attached to the slide member, a cutter blade attached to the lever arm at its lower end, a pair of guide rails supported parallel to the slot in the barrel and in spaced relation from the barrel, a supporting member extending outwardly from the lower end of the lever arm at a point near the heel of the cutter blade, said member to ride upon the guide rails, the rails to terminate at a point a spaced distance from the lower end of the barrel, the lower end of the barrel beyond the end of the rails to have a transversely extending slot, and a spring means to force the cutter supporting rod with force against the guide rails with increasing force as the cutter blade is moved toward the lower ends of the rails, the cutter blade to snap suddenly inwardly through the opening in the lower end of the barrel as the cutter supporting rod slips off the ends of the guide rails.

2. In a vegetable harvesting device including a barrel and a cutter structure, a means of removing the cut vegetable from the barrel comprising a leaf member of a form to fit within the upper end of the barrel, said barrel having an opening opposite the leaf member, supporting members attached to the leaf member and pivotally attached to the barrel near its upper end, a spring means to hold the leaf member closely against the inner surface of the barrel, a slide member slidable within a slot in the barrel, a means of operating the slide member, and a cam member on the slide member to engage with the supporting member of the leaf structure as the slide member is lifted upwardly to cause the bottom end of the leaf member to move about its pivotal point and kick outwardly toward the opening in the barrel.

3. In an asparagus harvesting device including a hopper, a guide barrel having a longitudinal guide slot, a longitudinal outlet slot opposite the guide slot, a member slidably mounted in the guide slot, a handle attached to the guide barrel, an operating handle attached to the slide member, a severing and conveying blade pivotally attached to the slide member, and an ejector means mounted inside the guide barrel in the line of travel of the slide member for kicking a severed asparagus tip off the supporting cutter blade through the longitudinal outlet slot into the hopper.

4. In an asparagus harvesting device, a hollow cylindrical body, a slide means mounted upon the body, a cutter blade supporting member pivotally attached to the slide member, a cutter blade attached to the supporting member, means whereby blade is moved down the barrel on the outside, spring means to snap the blade through an opening near the bottom of the body and means to carry it up the inside of the hollow body to a point opposite an outlet opening, and a cam activated means at this point to remove the cutter blade to the outside of the body member.

5. In an asparagus harvesting device, a hollow cylindrical body, a hopper attached to the body, an outlet opening in the body adjacent to the hopper, a supporting handle attached to the body member, a slidable member, a cutter blade and cutter blade supporting member pivotally attached to the slidable member, an operating handle attached to the slidable member, a spring means for biasing the cutter inwardly, guide means for forcing the cutter against the spring to cause a snap action of the cutter blade when it reaches the bottom of the body member, a means for removing a vegetable cut by the cutter from the inside of the body portion comprising a leaf like member within the body portion pivotally attached to the body member at its upper end, said leaf member actuated by a cam means attached to the slidable member, and a spring means attached to the cutter blade to return said cutter blade to a position outside the barrel after a complete operation of cutting off a stalk, conveying it upwardly and kicking it outwardly into the hopper by means of the leaf like member.

6. In a device of the character described, a barrel, a cutter means, slidably mounted in said barrel, which serves also as a platform for raising the cut stalk, means for reciprocating the cutter up and down with regard to the barrel, and guide means mounted on the barrel for holding the cutter outside the barrel on its downward travel.

7. In a device of the character described, a barrel, a cutter means, slidably mounted in said barrel, which serves also as a platform for raising the cut stalk, means for reciprocating the cutter up and down with regard to the barrel, guide means for holding the cutter outside the barrel on its downward travel and biasing means operative at the bottom of the downward movement of the cutter for biasing it inwardly toward the center of the barrel.

8. In a device of the character described, a barrel having a vertical slot therein, a cutter means, slidably mounted in said slot, which serves also as a platform for raising the cut stalk, means for reciprocating the cutter up and down with regard to the barrel, biasing means operative at the bottom of the downward movement of the cutter for biasing it inwardly toward the center of the barrel into its normal position, and a track outside the barrel and mounted thereon for holding the cutter outside the barrel until a certain predetermined point is reached on its downward movement.

9. In a device of the character described, a tube to be placed over the asparagus tip, a cutter, a hand slide means for moving the cutter, said slide means being mounted to move the length of the tube, means which holds the cutter outside of the tube on its downward movement and inside of the tube in its upward movement in order to cut off the asparagus tip and raise it to a higher level, a discharge member for discharging the asparagus tip from the tube, a cam member mounted on the cutter to actuate the discharge member, and spring means for biasing the cutter inwardly at the bottom of the tube.

10. In a vegetable harvesting device, a hollow tube-like body member having a slot therein, a cutter means mounted for reciprocation in said slot, spring means to actuate said cutter means, means for raising the cutter with the vegetable to a higher level, a container mounted on said tube, a means for removing the vegetable from the main body member and placing it in the container, and a handle attached to the cutter means whereby these various actions are performed by reciprocating the said handle.

11. In a device of the character described, a tube to be placed over the asparagus tip, a cutter mounted to move the length of the tube, a slide means for moving the cutter, guide means which holds the cutter outside of the tube on its downward movement and inside of the tube in its upward movement in order to cut off the asparagus tip and raise it to a higher level, a discharge member for discharging the asparagus tip from the tube, a cam member mounted on the cutter to actuate the discharge member, spring means for biasing the cutter inwardly at the bottom of the tube, the tube having an opening in the side thereof, and a hopper member for attachment to the tube, said hopper being open on the side adjoining the opening in the tube and having perforated bottom portions to permit dirt and the like to fall through to the ground.

12. In a device of the character described, a tube having a slot therein to be placed over the asparagus tip, a cutter, slide means for reciprocating the cutter up and down the tube, spring means for biasing the cutter inwardly at the bottom of the slot, and means for removing the cutter from the tube at the top of the slot, whereby the cutter shall move outside of the tube in its downward travel and inside the tube in its upward travel in order to cut off the asparagus tip and raise it to a higher level.

13. In a vegetable harvester, a tube having an opening in the lower portion thereof, said tube to be placed over the vegetable tip, a cutter blade, spring means for biasing the cutter inwardly into the tube, and guide rails positioned to prevent inward movement of the cutter on the downward travel but terminating when the cutter is registered with the opening in the tube so that the cutter will be released at the end of its downward travel and driven inwardly toward the opening with a snap by the spring to cut the stalk.

14. In a vegetable harvester, a tube having an opening in the lower portion thereof, said tube to be placed over the vegetable tip, a cutter blade, spring means for biasing the cutter inwardly into the tube, guide rails positioned to prevent inward movement of the cutter on its downward travel but terminating when the cutter is registered with the opening in the tube so that the cutter will be released at the end of its downward travel and driven inwardly through the opening with a snap by the spring to cut the stalk, means for raising the cutter inside the tube, and leaf means located inside the tube actuated by the movements of the parts of the cutter to kick the vegetable stalk out of the tube.

15. In a vegetable harvester, a tube having an opening in the lower portion thereof, said tube to be placed over the vegetable tip, a cutter blade, spring means for biasing the cutter inwardly into the tube, guide means positioned to prevent inward movement of the cutter on its downward travel but terminating when the cutter is registered with the opening in the tube so that the cutter will be released at the end of its downward travel and driven through the opening with a snap by the spring to cut the stalk, means for raising the cutter inside the tube, a leaf means located inside of the tube actuated by the movement of the parts of the cutter to kick the vegetable stalk out of the tube, and means for withdrawing the cutter from the tube so that it may pass downwardly outside the tube again.

16. In a vegetable harvesting device including a cutter blade, spring means to actuate said cutter blade, an elevating device, a container, means for removing the severed vegetable tips from the conveying blade to the container, a means for positioning the cutter and conveying blade for another cycle of operation, and a single reciprocating handle for operating all of said means.

HARRY DEMORY.